Dec. 5, 1939.   G. G. GARVIS   2,182,225
BARBECUE MACHINE
Filed June 27, 1938   2 Sheets-Sheet 1
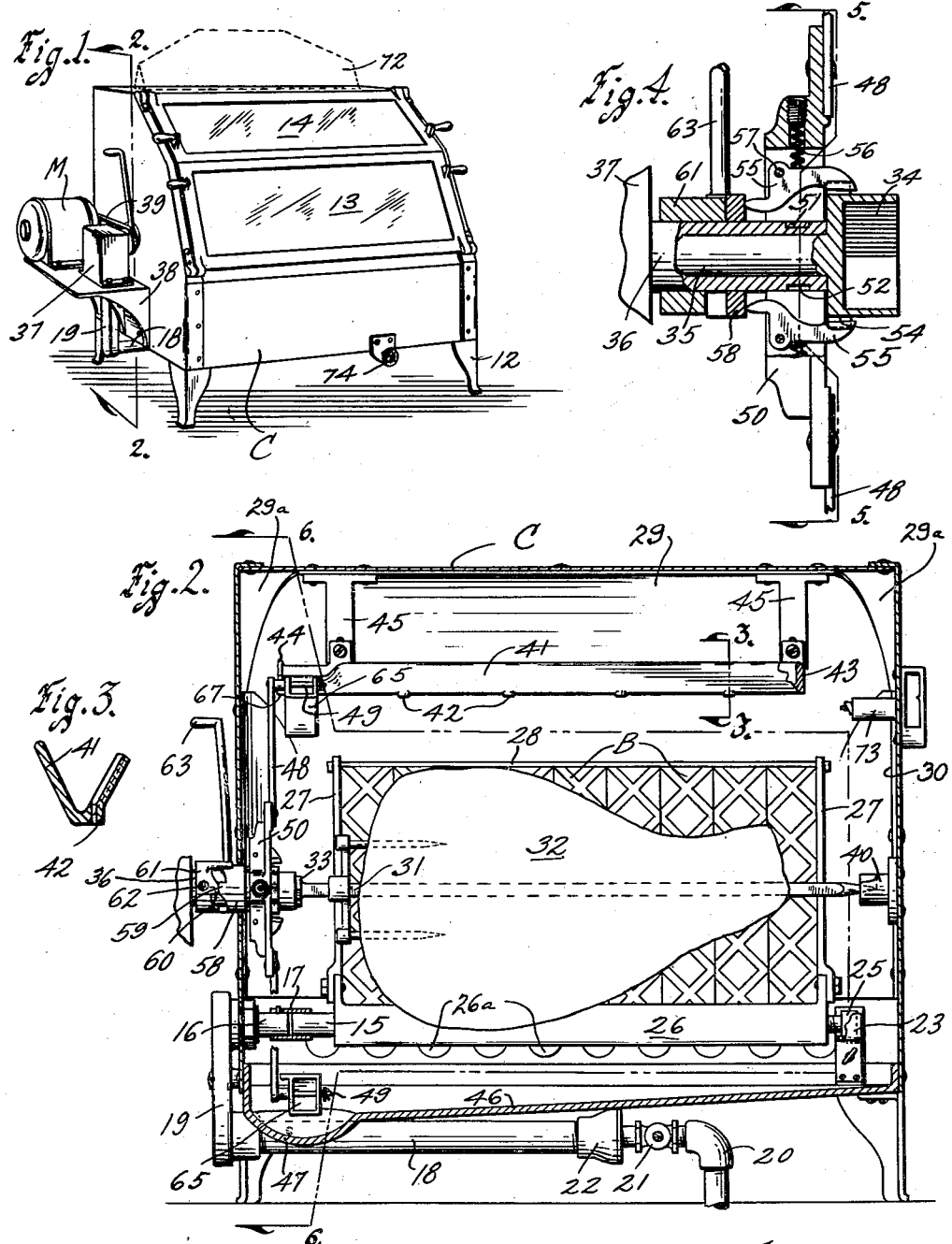
Witness
H. S. Mungermaier
Inventor
Gus G. Garvis
by Bair & Freeman
Attorneys

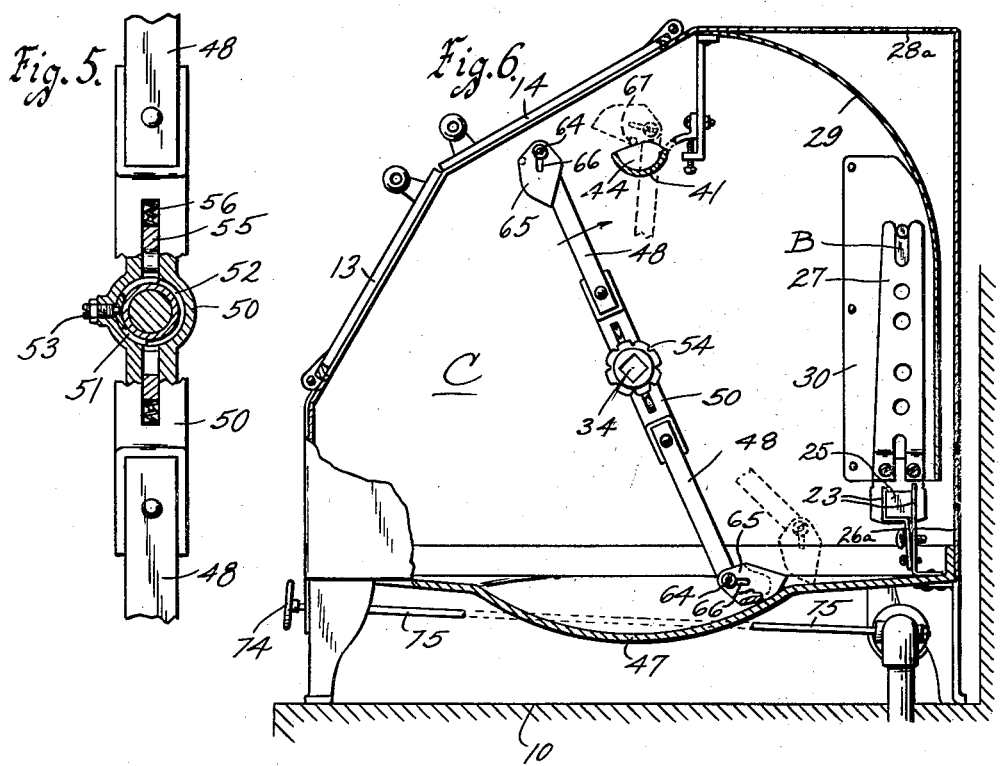

Patented Dec. 5, 1939

2,182,225

UNITED STATES PATENT OFFICE 2,182,225

BARBECUE MACHINE

Gus G. Garvis, Des Moines, Iowa

Application June 27, 1938, Serial No. 216,077

8 Claims. (Cl. 53—5)

An object of my present invention is to provide a barbecue machine of simple, durable and inexpensive construction having improved structural features over the machine disclosed in my patent, No. 1,740,729, dated December 24, 1929.

A further object is to provide a barbecue machine in which the barbecuing mechanism is entirely enclosed yet is visible for display purposes, the shape of the casing being substantially rectangular but the front upper corner thereof being cut away, and doors of transparent material being provided across the cut-away corner of the casing to render the interior of the casing and the barbecuing mechanism therein readily visible to the customers.

A further object is to provide a basting means for the articles being barbecued in the machine which is comparatively simple to manufacture and operate and can be rendered operative or inoperative as desired by a simple clutch mechanism.

Still a further object is to provide basting means including a basting trough, a sump for catching basting liquid or drippings from the articles being barbecued and bucket means for dipping the basting liquid out of the sump and depositing it in a basting trough from which it flows over the articles.

Still a further object is to provide means for rotating the spit of the barbecue machine and a pair of basting arms rotatable on this means but capable of operative connection therewith to thereby secure rotation of the basting arms, the arms carrying buckets which are pivoted thereto and are engageable with the edge of the sump and with the edge of the basting trough for respectively positioning the bucket for dipping up the basting liquid and depositing the liquid in the basting trough.

Another object is to provide a modified structure which eliminates the basting feature and has a removable trough for catching the drippings from the article being barbecued.

Still a further object is to provide a burner so supported in the casing of the barbecue machine that it is readily removable for cleaning or renewing purposes.

With these and other objects in view, my invention consists in the construction, arrangement and combination of the various parts of my barbecue machine whereby the objects contemplated and others as well are attained, as hereinafter more fully set forth, pointed out in my claims and illustrated in the accompanying drawings, wherein:

Figure 1 is a perspective view of a barbecuing machine embodying my invention.

Figure 2 is an enlarged vertical sectional view thereof on the line 2—2 of Figure 1.

Figure 3 is an enlarged sectional view on the line 3—3 of Figure 2 showing the construction of the basting trough of my machine.

Figure 4 is an enlarged vertical sectional view through the clutch mechanism of Figure 2 as taken on the line 2—2 of Figure 1, the clutch being shown in front elevation in Figure 2.

Figure 5 is a sectional view on the line 5—5 of Figure 4, and

Figure 6 is a vertical sectional view on the line 6—6 of Figure 2.

On the accompanying drawings I have used the reference character C to indicate generally a casing. The casing C is supported relative to a countertop or other support 10 by legs 12. The casing C in cross section as shown in Figure 6 is substantially rectangular with the upper front corner cut away and closed by a pair of door elements 13 and 14. These are arranged one above the other at an obtuse angle relative to each other. The door 13 is at an obtuse angle relative to the front of the casing C while the door 14 is at an obtuse angle relative to the top of the casing.

The doors 13 and 14 are preferably hinged to the casing C for convenience of opening them and gaining access to the barbecuing mechanism in the casing and are formed of transparent material, such as glass or the like. This particular arrangement of the doors permits ready display of the barbecuing mechanism in operation and the articles being barbecued in the machine particularly to customers standing in front of the counter.

Within the casing C I provide a plurality of burner elements B supported by a gas pipe 15. The gas pipe 15 is connected to a supply pipe 16 by a sleeve 17. A second supply pipe 18 supplies gas and air to the supply pipe 16 through a connecting manifold 19 at the end of the casing C. A gas supply pipe 20 supplies gas through a control valve 21 and an air and gas mixer 22 to the supply pipe 18. The gas pipe 15 has one end supported by the sleeve 17 and its opposite end supported in a clamp 23. A wing screw 24 is provided for operating the clamp 23. The clamp end of the gas pipe 15 is provided with an angular plug 25 adapted to coact with the clamp 23. The sleeve 17 is slidable on the pipes 15 and 16 so that the gas pipe 15 and the burner elements B supported thereby may be removed for cleaning or replacement purposes. A supporting frame consisting of a base member 26 and members 27, together with a tie rod 28, are provided for supporting the burner elements B (which are usually of fire clay or ceramic material) relative to the gas pipe 15. The angular plug 25 when clamped in position retains the burner elements B in a substantially vertical plane.

For reflecting the heat of the burner elements B forwardly, a reflector wall 29 of polished metal is provided behind the burner elements, having wings 30 secured to the ends of the casing C. Air for combustion is admitted to the burners B through openings 26a in the back of the casing C. Openings 28a in the top of the casing permit escape of the products of combustion after they pass through spaces 29a at the ends of the reflector 29.

A spit 31 is supported in the casing C and in turn supports a ham 32 or other article to be barbecued. One end of the spit 31 has an enlarged angular head 33 adapted to be received in an angular socket 34 of a drive shaft 35. The drive shaft 35 is journalled in a sleeve-like bearing 36 of a gear reducer casing 37.

The casing 37 is mounted on a shelf 38 which also supports a motor M. The motor is operatively connected with the gear reducing mechanism in the casing 37 as by a belt 39. The gear reducing mechanism in the casing 37 is of well-known construction for transmitting rotation at a reduced speed from the pulley driven by the belt 39 to the shaft 35. The opposite end of the spit 31 is rotatably supported in a bearing 40.

Within the casing C above the article being barbecued is a basting trough 41. The trough 41 as shown in Figure 3 has a plurality of perforated bosses 42 which have their upper ends higher than the bottom of the trough. This results in an even flow of basting liquid from the different perforated bosses 42 when the trough is partially filled with basting liquid. The trough 41 has closed ends as indicated at 43 and 44 (see Figures 2 and 6). The trough is supported by brackets 45 depending from the top of the casing C.

A bottom 46 is provided for the casing C and this bottom has a depressed portion or sump 47. The sump 47 is adapted to receive basting liquid or drippings from the article 32. I provide means for transferring the basting liquid from the sump 47 to the basting trough 41 comprising a pair of basting arms 48 carrying basting buckets 49. The arms 48 are supported by spiders 50 which are rotatable on the sleeve 36 of the gear reducer housing 37. The spider 50 is retained against longitudinal movement relative to the sleeve 36 by an arcuate shoe 51 fitting an annular groove 52 of the sleeve and retained relative to the bore of the spider 50 by a set screw 53, as shown in Figure 5.

The socket member 34 of the drive shaft 35 is provided with a plurality of notches 54. The spider 50 is provided with clutch lugs 55 adapted to coact therewith. Such coaction is normally caused by springs 56 urging the clutch lugs 55 to engage the notches 54 as shown in Figure 4. The clutch lugs are pivotally mounted on pins 57.

For disengaging the clutch lugs 55 from the notches 54, I provide a sleeve 58. The sleeve 58 is provided with cam lugs 59 cooperable with cam lugs 60 of a sleeve 61 fixed to the sleeve 36 by a set screw 62 (see Figure 2). A clutch lever 63 extends from the sleeve 58 and is adapted to rotate the cam lugs 59 relative to the cam lugs 60 either to the position shown in Figure 2 for disengaging the clutch lugs 55 from the notches 54 or to positions out of alignment with each other where such engagement is permitted as in Fig. 4. Thus the clutch mechanism is selectively operable for rotating the basting arms 48 with the drive shaft 35 or permitting them to remain stationary as desired.

The sides of the notches 54 as illustrated in Figure 6 are inclined and likewise the sides of the clutch lugs 55 are inclined so that in case of an obstruction preventing rotation of the basting arms 48 the clutch lugs will slip from the successive notches when the drive shaft 35 is rotated and prevent breakage of the parts. The basting arms 48 on their outer ends carry supporting pins 64. These have pivotally and slidably mounted thereon buckets 65. The buckets are slotted at 66 to prevent any binding action of the bucket during operation. Referring to Figure 6 a dotted position for the lower bucket is illustrated. This is the position assumed prior to the entrance of the bucket into the sump 47. Due to the pivotal and slidable connection between the supporting pin 64 and the bucket 65, the bucket will be brought to a position as shown by solid lines for dipping up a quantity of basting liquid in the sump 47 as the basting arm 48 swings through the sump.

The pivotal connection of the bucket to the arm permits the bucket to retain its load of basting liquid without spilling it, as shown by the upper basting arm in Figure 6. When this arm approaches the dotted position, a projecting pin 67 on the bucket engages the end 44 of the basting trough 41 in a manner for the end 44 to act as a cam for swinging the bucket upwardly to effectively discharge all its contents into the basting trough 41. The basting liquid then runs along the trough and is discharged through the perforated bosses 42 on to the article 32.

I have provided an inexpensive and selectively operable basting means for my barbecue machine which eliminates any trouble as experienced with pumps or the like for raising the basting liquid from the sump to the basting trough. I have provided a burner mechanism for the machine which can be readily removed for cleaning and replacement purposes. These features as well as the others enumerated all contribute to providing an easily operated and efficient machine.

The machine may have thereon an advertising sign or the like 72 shown by dotted lines in Figure 1 and additional features for convenience may be provided, such as a thermostat 73 for reading the temperature of the interior of the casing C. The burner can then be adjusted manually to secure the proper temperature. Such an adjustment is effective through manual manipulation of a hand wheel 74 secured to an extension rod 75 extending from the valves 21.

Some changes may be made in the construction and arrangement of the parts of my machine without departing from the real spirit and purpose of my invention, and it is my intention to cover by my claims any modified forms of structure or use of mechanical equivalents, which may be reasonably included within their scope.

I claim as my invention:

1. In a barbecue machine, a casing, barbecuing mechanism therein including a spit, means for imparting rotation to said spit, a sump below said spit to catch drippings from articles being barbecued on said spit, a basting trough above said spit, an arm carried by said spit, a bucket thereon for dipping basting liquid from said sump and means to dump the contents of said bucket into said trough as said arm passes said trough, said trough having a cam on the end thereof engageable with said bucket to tip it to dumping position.

2. In a barbecue machine, a casing, barbecuing mechanism therein including a spit, means for imparting rotation to said spit, a sump below said spit to catch drippings from articles being barbecued on said spit, a basting trough above said spit, an arm carried by said spit, a bucket pivoted thereto and having slotted connection therewith whereby to engage with the edge of said sump to tip the bucket to a position for receiving basting liquid as the arm swings through the sump, said bucket being engageable with the edge of the trough to dump the contents of the bucket into the trough as the arm passes the trough.

3. In a barbecue machine, a casing, barbecuing mechanism therein including a spit, a sump below said spit to catch drippings from articles being barbecued on said spit, a basting trough above said spit, and motor driven means including a rotating arm and a bucket thereon for dipping basting liquid from said sump and for dumping said basting liquid into said trough, said bucket having a slot and pin connection with said arm.

4. In a barbecue machine, a casing, barbecuing mechanism therein including a spit, motor driven means for imparting rotation to said spit, a sump below said spit to catch drippings from articles being barbecued on said spit, a basting trough above said spit, an arm carried by said motor driven means, a bucket pivoted thereto and engageable with the edge of said sump to tip the bucket to a position for receiving basting liquid as the arm swings through the sump, said bucket being engageable with the edge of said trough to dump the contents of the bucket thereinto as the arm passes the trough.

5. In a barbecue machine, a spit, means for rotating said spit, said means including a shaft, a basting arm rotatable relative to said shaft, means carried by said basting arm and operatively engageable selectively with said shaft to rotate said basting arm when the shaft rotates, a sump for catching drippings from articles being barbecued on said spit, a bucket on said arm for dipping liquid from said sump and means to dump the contents of said bucket into said trough as said arm passes said trough, said trough having a cam on the end thereof engageable with said bucket to tip it to dumping position.

6. In a barbecue machine, a spit, means for rotating said spit, said means including a shaft, a basting arm rotatable relative to said shaft, means carried by said basting arm for operatively engaging said basting arm with the shaft, a sump for catching drippings from articles being barbecued on said spit, a bucket on said arm for dipping liquid from said sump and means to dump the contents of said bucket into said trough as said arm passes said trough.

7. In a barbecue machine, a spit, a basting trough thereabove, means for rotating said spit, said means including a shaft, a basting arm rotatable relative to said shaft, means carried by said basting arm and operatively engageable selectively with said shaft to rotate said basting arm when the shaft rotates, a sump for catching drippings from articles being barbecued on said spit, a bucket on said arm pivoted thereto and engageable with the edge of said sump to tip the bucket to a position for receiving basting liquid as the arm swings through the sump, said bucket being engageable with the edge of the trough to dump the contents of the bucket into the trough as the arm passes the trough.

8. In a barbecue machine, a spit, a basting trough above said spit, a basting arm, means for rotating said basting arm, a sump for catching drippings from articles being barbecued on said spit, a bucket on said arm engageable with the edge of said sump to tip the bucket to a position for receiving basting liquid as the arm swings through the sump, said bucket being engageable with the edge of the trough to dump the contents of the bucket into the trough as the arm passes the trough.

GUS G. GARVIS.